United States Patent [19]
Chandler et al.

[11] 3,722,276
[45] Mar. 27, 1973

[54] VOLUMETRIC FLOW RATE MEASUREMENT OF A FLOWING STREAM

[75] Inventors: Ronald W. Chandler, Richardson; Jack B. Hammond, Carrollton, both of Tex.

[73] Assignee: Tetradyne Corporation, Dallas, Tex.

[22] Filed: Dec. 6, 1971

[21] Appl. No.: 204,837

[52] U.S. Cl..............................73/194 E, 324/30 B
[51] Int. Cl................................................G01f 1/00
[58] Field of Search .........73/194 E, 194 F; 324/30 B

[56] References Cited

UNITED STATES PATENTS

| | | | |
|---|---|---|---|
| 1,200,653 | 10/1916 | Sawyer | 73/194 F X |
| 2,826,699 | 3/1958 | Hull | 73/194 E |
| 3,324,720 | 6/1967 | Sutherland | 73/194 E |
| 3,491,592 | 1/1970 | Evers et al. | 73/194 F |
| 3,582,767 | 6/1971 | Brum et al. | 324/30 B |
| 3,638,489 | 2/1972 | Buran et al. | 73/194 E |

Primary Examiner—Charles A. Ruehl
Attorney—Richards, Harris & Hubbard

[57] ABSTRACT

The specification discloses a technique for determining the volumetric flow rate of a flowing stream wherein a predetermined quantity of material which will alter the electrical conductivity of the stream is selectively introduced into the stream. A conductance probe is disposed downstream from the point at which the material is deposited in order to continuously detect the electrical conductivity of the stream. An enforced linearity electrical bridge is responsive to the output of the probe for detecting the change in conductance of the stream which is caused by the added material. Integrating circuitry integrates the change in conductance determined by the bridge. A nonlinear meter is responsive to the integrating circuit, along with an indication of the electrolyte equivalents of the deposited material, in order to directly indicate the volumetric flow rate of the stream. Circuitry is provided to prevent the polarization of the conductance probe. A reset circuit enables the integrating circuitry to be set to zero for additional measuring cycles.

19 Claims, 2 Drawing Figures

PATENTED MAR 27 1973　　3,722,276

INVENTORS:
JACK B. HAMMOND
RONALD W. CHANDLER

Richards, Harris & Hubbard
ATTORNEYS

VOLUMETRIC FLOW RATE MEASUREMENT OF A FLOWING STREAM

FIELD OF THE INVENTION

This invention relates to the measurement of flow rate, and more particularly relates to the determination of the volumetric flow rate of a flowing stream by the introduction into the stream of a predetermined quantity of material which alters the electrical conductivity of the stream.

THE PRIOR ART

It is often necessary in a variety of environments to determine the volumetric flow rate of a flowing stream of fluid. For example, it is often essential to provide an accurate indication of the volumetric flow rate in sewage collection systems in order to properly control the sewage processing steps of the system. In addition, it is important to measure the rate of fluid flow through pipelines carrying water, oil, chemicals and other materials.

It has been heretofore proposed to introduce materials to vary the conductivity of a flowing stream and to subsequently measure the impedance of the stream. A curve of the resistance of the stream versus time is then prepared, and the area beneath the curve is utilized to determine the flow rate of the stream. An example of such a technique is described in Engineering Hydraulics, published by John Wiley & Sons, Inc., New York, N.Y., 1949, pp. 208-209. Such prior techniques have not, however, provided automatic direct readouts of the volumetric flow rate, and have generally required a relatively complex sampling technique. Moreover, such previous developed measuring processes have tended to drift during measurements, thereby resulting in erroneous readings. Previous techniques have also not been completely satisfactory with respect to accuracy due to failure to recognize the importance of the relationship between measuring time and electrolyte strength.

Techniques have also heretofore been developed for measuring the rate of fluid flow by introducing a known quantity of radioactive material and subsequently detecting the total number of radioactive rays as a function of time. The flow rate is then determined as being inversely proportional to the integral of the detected radioactive rays. However, such systems have required special equipment and safety precautions due to the radioactive materials utilized. Furthermore, such systems have generally not provided an absolute flow measurement except when used with a predetermined size of conduit. Furthermore, background noise and other factors tend to reduce the accuracy of such systems.

SUMMARY OF THE INVENTION

In accordance with the present invention, a method and system is provided which overcomes or eliminates many of the problems associated with the prior art techniques. The present invention provides an automatic and direct readout of volumetric flow rates of flowing fluid streams of all types and with all sizes of conduits. The present system does not require the use of radioactive materials and may be practiced by personnel of relatively low skill without intensive training.

In accordance with the present invention, a method is provided for determining the volumetric flow rate of a flowing stream which includes constantly measuring the electrical conductivity of the stream at a first point. A known quantity of a material which will alter the electrical conductivity of the stream is deposited into the stream at a second point upstream of the first point. The change in electrical conductance of the stream caused by the material is determined at the first point, and the conductance change is integrated. The integrated conductance change is then utilized to determine and display the volumetric flow rate of the following stream.

In accordance with another aspect of the present invention, a system is provided for determining the volumetric flow rate of a flowing stream which includes structure for measuring the change in electrical conductance of the stream caused by the introduction of a known quantity of a material which alters the electrical conductivity of the stream. Circuitry is provided to integrate the change in electrical conductance of the stream. Circuitry responsive to the output of the integrating circuit automatically generates an indication of the volumetric flow rate of the stream.

In accordance with a more specific aspect of the invention, a system is provided for determining the volumetric flow rate of a flowing stream. A device is provided for selectively depositing in the stream a predetermined quantity of material which alters the electrical conductivity of the stream. A probe is disposed downstream of the depositing device for detection of the electrical conductivity of the stream. An enforced linearity bridge is responsive to the probe to generate indications of the change in conductance of the stream caused by the material. Integrating circuitry integrates the change in conductance. A non-linear meter is responsive to the output of the integrating circuit and the amount of electrolyte equivalents injected into the stream in order to indicate the volumetric flow rate of the stream.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
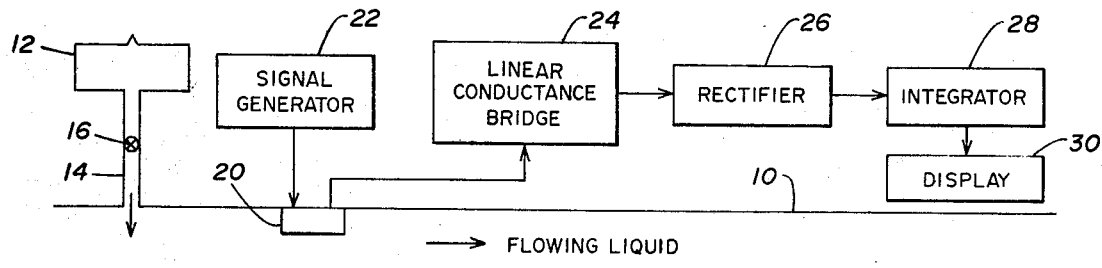
FIG. 1 is a block diagram of the present system.

Referring to FIG. 1, a block diagram of the present system is illustrated wherein a flowing stream of liquid flows through the pipeline 10. The flowing liquid may comprise any of a number of different types of fluids, such as sewage, chemicals or the like. A container 12 communicates with the pipeline 10 via an inlet member 14. Container 12 contains a quantity of a suitable material which will alter the conductivity characteristics of the flowing stream within the pipeline 10. A valve 16 may be either manually or automatically operated in order to dispense a metered amount of material into the pipeline 10. Alternatively, a water soluble package filled with a predetermined amount of material can be manually added to the pipeline 10. Any suitable material may be used which will alter the electrical conductance of the flowing stream. In an aqueous stream, it is generally preferred to use sodium chloride in order to raise the conductance of the flowing stream. However, in a brine stream, distilled water may be injected from the container 12 in order to drop the conductance of the brine stream.

The amount of electrolyte material injected into a flowing stream will depend upon the flow rate of the stream. For a flow rate of 10 to 20 gallons per minute, about $1.2 \times 10^{-2}$ electrolyte equivalents will be required to be injected into the stream. For flow rates in the range of about 100 to 1,000 gallons per minute, about 10 times that amount of electrolyte is required. For pipeline flow rates of about 1,000 to 10,000 gallons per minute, about 100 times that amount of electrolyte is required.

Downstream from the container 12 is located a conductance probe 20 which directly measures the electrical conductance of the flowing stream. An alternating signal from a signal generator 22 is imposed upon the probe 20 in order to prevent polarization and subsequent plating of the probe 20. The probe 20 is connected to a linear conductance bridge 24 which is balanced by the normal conductance of the stream of flowing liquid. When the probe 20 senses the changed conductivity of the flowing liquid due to the injection of material from container 12, the bridge 24 becomes unbalanced and generates a signal representative of the change in conductance. The signal is rectified by a rectifier 26 and is integrated by an integrator 28. A display is responsive to the output of the integrator 28 and is calibrated according to the number of equivalents of electrolytes of the material deposited from container 12, to directly indicate the volumetric flow rate of the stream of flowing liquid. This indication is not dependent upon the characteristics of the pipeline 10, and the present system will work with either a closed or open pipeline.

Figure 2:
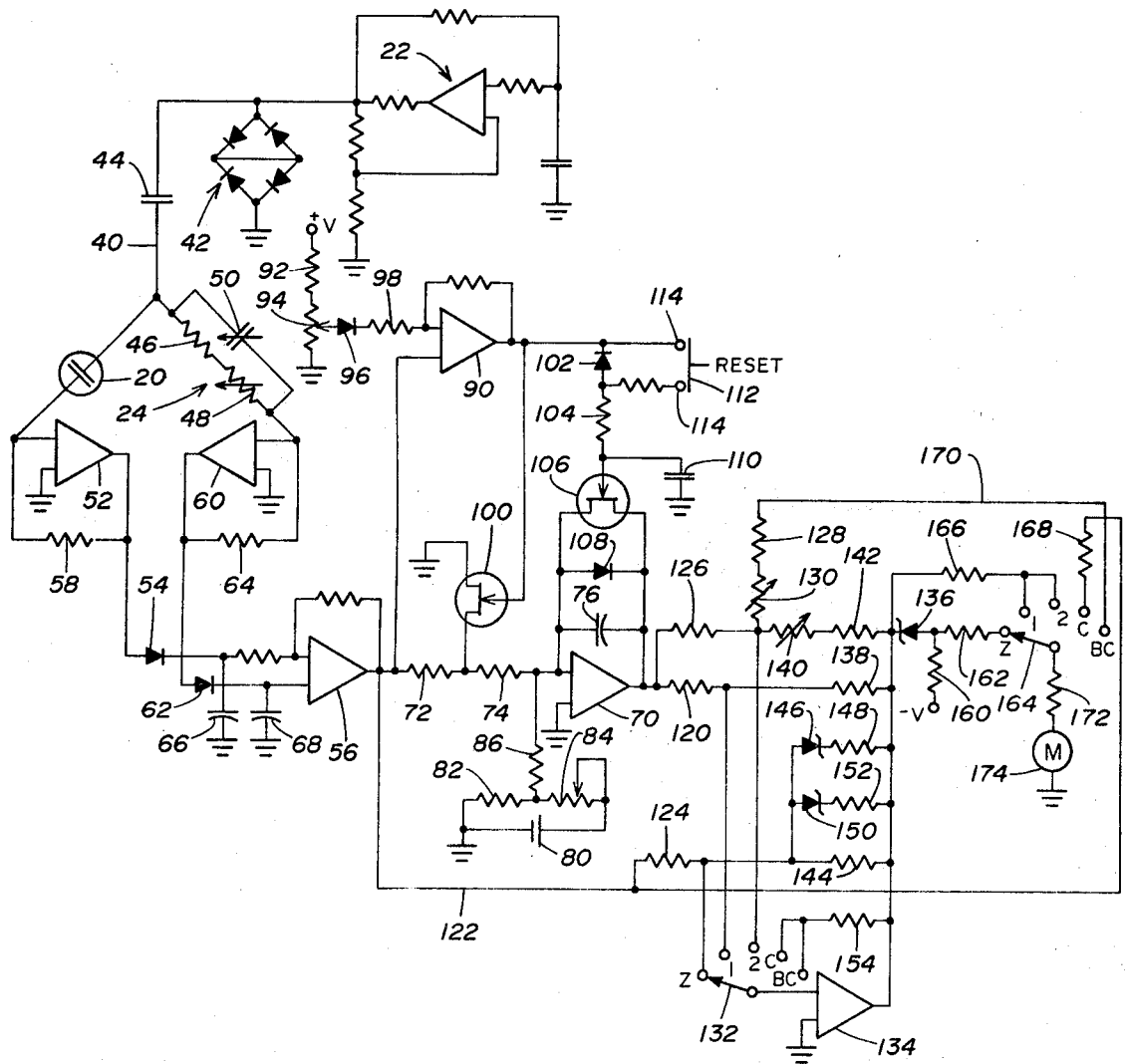
FIG. 2 is a schematic diagram of the preferred embodiment of the invention.

FIG. 2 illustrates in schematic detail the electrical circuitry of the preferred embodiment of the invention. The conductance probe 20 may comprise any suitable conductivity cell, such as the type wherein a potential gradient is imposed across a pair of spaced apart electrodes. Conductivity probe 20 thus provides an indication of the quantity of electrical energy transferred across a unit area, or the reciprocal of the resistivity of the medium between the spaced apart electrodes. The conductance probe 20 is connected in one arm of an enforced linearity bridge 24. A square wave signal is impressed upon the bridge 24 via a lead 40 from the square wave signal generator 22. A rectifier bridge 42 is connected between circuit ground and the output of the square wave generator. The square wave signals are coupled to the bridge 24 via or through a capacitor 44.

A pair of resistors 46 and 48 are connected in series to form the second arm of the bridge 24. A variable capacitor 50 is connected across the resistors to enable balancing of the bridge. An amplifier 52 is connected to receive the output of the cell 20 as an input, with the second input of the amplifier being connected to circuit ground. The output of the amplifier 52 is connected through a diode 54 to an input of a differential amplifier 56. A feedback resistor 58 is connected across the amplifier 52. An amplifier 60 is connected to form the fourth arm of the bridge 24, with the output of amplifier 60 being connected through a diode 62 to the second input of the differential amplifier 56. A resistor 64 is connected across amplifier 60.

It will thus be seen that the bridge 24 comprises an enforced linearity conductance bridge to provide a linear direct current indication of the change in conductivity above or below the nulled level of the bridge. The linear bridge 24 prevents variance of the zero level of the system, thus providing a continuously accurate system. The direct current signals from bridge 24 are applied to the inputs of the differential amplifier 56. Capacitors 66 and 68 are connected between the inputs of amplifier 56 and circuit ground. The output of amplifier 56 is connected to the input of an amplifier 70 through resistors 72 and 74. A capacitor 76 is connected across the amplifier 70 to form, in conjunction with the resistors and the amplifier, an integrator circuit. A voltage source 80 is connected through resistors 82, 84 and 86 to provide a selected bias level to the input of the integrator amplifier 70.

The output from the differential amplifier 56 is also applied to a high gain amplifier 90. A positive voltage is applied to the second input of amplifier 90 via resistors 92 and 94, diode 96 and resistor 98. The output of amplifier 90 is applied to the gate of an n channel field effect transistor (FET) 100. The FET 100 is connected between circuit ground and a juncture between resistors 72 and 74. The output of amplifier 90 is also connected through a diode 102 and a resistor 104 to the gate of an $n$ channel FET 106. FET 106 and diode 108 are connected in parallel across the amplifier 70. A capacitor 110 is connected between circuit ground and the gate of the FET 106. A manually operable reset button switch 112 is adapted to be closed against contacts 114 in order to reset the integrator circuit to zero, as will be subsequently described in greater detail.

The output of integrator amplifier 70 is connected through a resistor 120 to a switch terminal 1. The output from amplifier 56 is applied via lead 122 through resistor 124 to a switch terminal Z. The output from amplifier 70 is also applied via resistor 126 to a switch terminal 2. Reference voltage is applied via resistors 128 and 130. A movable switch arm 132 may be manually operable between switch terminals Z, 1, 2, C or BC. Contact with the Z terminal allows the bridge 24 to be adjusted to provide a zero balance. Terminals 1 and 2 interconnect the system in either of two different volumetric flow rate ranges. The switch arm 132 may be contacted to the C terminal to provide an indication of the conductivity of the flowing stream, while the BC terminal provides a battery check for the system.

The movable switch arm 132 is connected to an input of an amplifier 134, the output of which is tied to the cathode of a Zener diode 136. The output of the integrator amplifier 70 is applied through resistor 120 and a resistor 138 also to the cathode of the diode 136. The output of amplifier 70 is additionally applied through resistor 126 and resistors 140 and 142 to the cathode of the diode 136. The output from the amplifier 56 is applied through resistor 124 and a resistor 144 to the cathode of the diode 136. A Zener diode 146 and a resistor 148 are connected in parallel with a Zener diode 150 and a resistor 152 which are connected across resistor 144. Terminals C and BC are connected through a resistor 154 to the cathode of the diode 136.

A negative reference voltage is applied through a resistor 160 and a resistor 162 to the Z terminal of a second set of switch terminals. A movable switch arm 164 is ganged with the switch arm 132 for manual operation therewith. The juncture of resistor 142 and diode 136 is tied through resistor 166 to terminals 1 and 2 of the switch. The output of amplifier 56 is applied through lead 122 and through a resistor 168 to terminal C of the switch. The source of battery potential is connected via lead 170 to the BC terminal of the switch. A resistor 172 is connected between the movable switch arm 164 and a nonlinear meter 174 which provides an indication of either the zero balance setting of the circuit, the volumetric flow rate of the system, the conductance of the flowing stream or an indication of the battery strength of the system, depending upon the setting of the switch arms 132 and 164.

In operation of the system, the probe 20 is disposed in the flowing stream of liquid or other fluid, and the switch arms 132 and 164 are set at the Z terminal. The bridge 24 is then balanced so that the meter 174 is centered to indicate a zero or null state of operation of the system. After the circuit is balanced, a base line of zero voltage is established at the outputs of each of the amplifiers 52 and 60 of the bridge 24 and at the output of amplifier 56. The predetermined amount of electrolyte material is then deposited into the stream from the container 12. The conductivity probe 20 senses the increase or decrease in conductivity of the flowing stream caused by the addition of the material, and generates an electrical signal which is applied to the differential amplifier 56.

As an example, when the material increases the conductance of the flowing stream, a signal is provided to the differential amplifier 56 such that a negative voltage output is generated therefrom. This negative voltage is directed to amplifier 70 and capacitor 76 and is integrated thereby. Additionally, the negative output from the amplifier 56 is directed to the high gain amplifier 90 which generates a voltage output which is applied through diode 102 to charge capacitor 110. Capacitor 110 thus holds the gate of the FET 106 off to thereby prevent current flow through the FET. In addition, the output from amplifier 90 holds the FET 100 at zero volts. Thus, the negative voltage is allowed to pass to the integrator amplifier 70, but any positive voltage will be grounded through the FET 100.

The integrated voltage from the integrator circuit is applied to the meter 174 over a resistive network determined by the setting of the switch arms 132 and 164. For example, in a preferred embodiment, for an injection of about $1.2 \times 10^{-2}$ equivalents of electrolyte injection, range 1 indicates a volumetric flow rate of 10 to 55 gallons per minute, while range 2 indicates a flow rate of about 55 to 100 gallons per minute. For an increased injection of about $1.2 \times 10^{-1}$ equivalents of electrolyte, range 1 provides an indication of from 100 to 550 gallons per minute, while range 2 provides an indication of 550–1,000 gallons per minute volumetric flow rate. For an injection amount of approximately 1.2 equivalents, range 1 indicates from 1,000–5,500 gallons per minute flow rate, while range 2 provides an indication of a flow rate of from 5,500–10,000 gallons per minute. It will be understood that the various flow rates and equivalents utilized by the present invention may be varied to suit various requirements.

If during the operation of the present device, it is desired to provide a direct indication of the conductivity of the flowing stream, the movable switch arms 132 and 164 are placed on the C terminals, and the meter 174 directly indicates the conductance of the flowing stream. In addition, if it is desired to check the operation of the batteries of the circuit, the movable switch arms are placed on the BC terminal to provide a direct indication of the strength of the batteries. As previously noted, the meter 174 is required to be nonlinear, unless it is desired to utilize a nonlinear circuit in conjunction with the meter 174.

After the desired reading of the volumetric flow rate of the flowing stream has been determined from meter 174, the reset button 112 is pushed to allow the capacitor 110 to discharge, thereby opening the FET 106 and discharging capacitor 76 to reset the integrator circuit. Diode 108 is utilized in the circuit as a safety feature to carry any high positive pulses which may be injected into the system. The bias circuitry connected to the input of the amplifier 70 may be adjusted to compensate for any drift in the amplifier 70.

The theory of operation of the circuit may be best understood by reference to the well-known equation:

$$E = KQ \int_0^t L \, dt \qquad (1)$$

wherein
$E$ = number of equivalents of electrolyte,
$K$ = constant,
$Q$ = volumetric flow rate,
$L$ = change in conductance induced by the addition of electrolyte to the flowing stream.

Referring to Equation 1, it will be seen that the volumetric flow rate of the flowing stream may be directly determined by calculation of $E$ and the integral of $L$. As the amount of electrolytes deposited into the flowing stream is known, the only variable to be determined by the present system is the integral of the change of conductance of the flowing stream caused by the introduction of the electrolyte thereto. Thus, the output of the integrator amplifier 70 is displayed through suitable resistor networks on meter 174 to provide a direct indication of the volumetric rate of the flowing stream.

An important aspect of the present invention is to insure that a sufficient amount of electrolyte material is detected and integrated within a specific time interval in order to provide satisfactory accuracy. Therefore, the spacing between the container 12 and the probe 20 and the number of electrolyte equivalents introduced into the stream must be carefully controlled in dependence upon the flow rate of the stream. In practice, it has been determined that in order to obtain satisfactory measurement accuracy, that the system must be so configured that the ratio of the amount of added electrolyte equivalents over the time interval during which a detected change in conductance is integrated will fall generally within the range of 0.005 to 0.01. Further, for a range of electrolyte equivalents of 0.02 to 4, a measurement interval of about 0.5 seconds to 50 seconds should be provided.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A method of determining the volumetric flow rate of a flowing stream comprising:
   a. constantly measuring the electrical conductivity of said stream with a sensor disposed in said stream at a first point;
   b. depositing into said stream at a second point upstream of said first point a known quantity of a material which will alter the electrical conductivity of said stream;
   c. determining at said first point the change in electrical conductance of said stream caused by said material;
   d. integrating said conductance change; and
   e. utilizing said integrated conductance change to automatically determine and display the volumetric flow rate of said flowing stream.

2. The method of claim 1 wherein said volumetric flow rate is determined from the inverse relation of said known quantity of material and said integrated change in conductance.

3. The method of claim 1 and further comprising:
   generating a linear electrical indication of the conductivity of the flowing stream prior to the deposit of said material,
   balancing a bridge circuit with said electrical indication, and
   detecting the output of said bridge circuit to detect the change in electrical conductivity after the deposit of said material.

4. The method of claim 3 and further comprising:
   impressing a repetitive alternating voltage upon said bridge circuit.

5. The method of claim 3 wherein said measuring of electrical conductivity is conducted within a time range of from 0.5 to 50 seconds, the length of said measuring being dependent upon the number of equivalents of the material deposited in said stream.

6. Apparatus for determining the volumetric flow rate of a flowing stream comprising:
   means for linearly measuring the change in electrical conductance of said stream caused by the introduction of a known quantity of a material which alters the electrical conductivity of said stream,
   means for integrating said change in electrical conductance, and
   means responsive to the output of said integrating means for automatically generating an indication of the volumetric flow rate of the stream.

7. The apparatus of claim 6 wherein said measuring means comprises:
   probe means adapted to be suspended in the flowing stream for measuring the conductivity of the stream, and
   an enforced linearity bridge circuit connected to said probe means and operable to be balanced prior to the introduction of said material into the stream.

8. The apparatus of claim 7 and further comprising:
   an alternating signal generator connected to said bridge means for prevention of polarization of said probe means.

9. The apparatus of claim 6 and further comprising:
   means for setting said integrating means to zero.

10. The apparatus of claim 6 and further comprising:
    nonlinear meter means responsive to the output of said integrating means and responsive to an indication of the magnitude of electrolyte equivalents of said material introduced into the stream.

11. A system for determining the volumetric flow rate of a flowing stream comprising:
    means for selectively depositing in the stream a predetermined quantity of material which will alter the electrical conductivity of the stream,
    probe means for being disposed downstream of said depositing means to detect the electrical conductivity of the stream,
    bridge means responsive to said probe means to generate indications of the change in conductance of the stream caused by said material,
    integrating means for integrating the change in conductance, and
    nonlinear meter means responsive to said integrating means and an indication of the electrolyte equivalents of said material for indicating the volumetric flow rate of the stream.

12. The system of claim 11 wherein said bridge means comprises an enforced linearity bridge, said probe means being connected across one arm of said bridge means, said bridge means being balanced prior to introduction of said material in the stream.

13. The system of claim 12 and further comprising:
    means for impressing an alternating voltage on said bridge means to prevent polarization of said probe means.

14. The system of claim 12 and further comprising:
    circuit means for holding the output of said integrating means at zero level when said bridge is balanced.

15. The system of claim 12 and further comprising:
    differential amplifier means connected to receive the output of said bridge means to detect decreases and increases in the conductance of the stream.

16. The system of claim 11 and further comprising:
    reset circuitry for resetting said integrating means to zero.

17. The system of claim 11 and further comprising:
    a plurality of resistive circuits each operable to be switched between said integrating means and said nonlinear meter means, each resistive circuit corresponding to a different amount of material deposited into the stream.

18. The system of claim 11 wherein the integration of the change in conductance is conducted within a time range of 0.5 to 50 seconds for electrolyte equivalents ranging between 0.02 to 4.0.

19. The system of claim 11 wherein the ratio of the equivalents deposited in said stream over the time of integration ranges from 0.005 to 0.01.

* * * * *